(12) United States Patent
Bobrow et al.

(10) Patent No.: US 7,069,520 B2
(45) Date of Patent: Jun. 27, 2006

(54) MOTION-BASED VISUALIZATION

(75) Inventors: Robert J. Bobrow, Arlington, MA (US); R. Bruce Roberts, Cambridge, MA (US); Colin Ware, Durham, NH (US); Ronald Pickett, Littleton, MA (US)

(73) Assignee: BBN Technologies Corp., Cambridge, MA (US)

( * ) Notice: Subject to any disclaimer, the term of this patent is extended or adjusted under 35 U.S.C. 154(b) by 21 days.

(21) Appl. No.: 10/703,102

(22) Filed: Nov. 5, 2003

(65) Prior Publication Data

US 2005/0093867 A1 May 5, 2005

(51) Int. Cl.
*G06F 17/00* (2006.01)
(52) U.S. Cl. ........................ 715/853; 345/473; 715/977
(58) Field of Classification Search ........ 345/473–475; 715/835–837, 815, 976–977, 853, 855
See application file for complete search history.

(56) References Cited

U.S. PATENT DOCUMENTS

| | | | | |
|---|---|---|---|---|
| 4,613,946 | A * | 9/1986 | Forman | 715/853 |
| 6,337,699 | B1 * | 1/2002 | Nielsen | 715/837 |
| 6,462,762 | B1 * | 10/2002 | Ku et al. | 715/853 |
| 2003/0206205 | A1 * | 11/2003 | Kawahara et al. | 345/854 |

OTHER PUBLICATIONS

Ahlberg, C. et al., "Dynamic Queries for Information Exploration: An Implementation and Evaluation," In *Proceedings of CHI '92*. ACM, New York, 619-626.
Bartram, L., et al., "Filtering and Brushing with Motion," *Information Visualization*, vol. 1, No. 1, pp. 66-79.
Bartram, L. et al., "Moving Icons: Detection and Distraction," In *Proceedings of INTERACT 2001*.
Becker, R.A. et al., "Brushing Scatterplots," *Technometrics* vol. 29 No. 2, May 1987 127-142.
Braddick, O. et al., "Serial Search for Targets Defined by Divergence or Deformation of Optic Flow," *Perception* vol. 20, 1991, pp. 345-354.

(Continued)

*Primary Examiner*—Richard Hjerpe
*Assistant Examiner*—Michelle K. Lay
(74) *Attorney, Agent, or Firm*—Fish & Neave IP Group Ropes & Gray, LLP.

(57) ABSTRACT

A data-display system employs a display in which the representations of data objects are caused to move on the display in order to convey information about the represented data objects. In one example, icons in a link-analysis display that represent data objects satisfying a selection criterion are made to execute distinctive motion. In another example, three-dimensional models of moving bodies in whose features components of respective data objects are encoded are projected onto a screen plane, and the resultant values are used to generate the display.

16 Claims, 9 Drawing Sheets

OTHER PUBLICATIONS

Callaghan, T. C., "Interference and Dominance in Texture Segregation," In *Visual Search*, D. Brogan, Ed. Taylor & Francis, New York, 81-87.

Driver, J. et al., "Motion Coherence and Conjunction Search: Implications for Guided Search Theory," *Perception & Psychophysics*, 1992, 5I, 1, pp. 79-85.

Duncan, J., "Boundary Conditions on Parallel Processing in Human Vision," *Perception* 1989, vol. 18, pp. 457-469

Duncan, J., et al., "Visual Search and Stimulus Similarity," *Psychological Review* 1989, vol. 96, 433-458.

Gronquist, J. et al., "Animated Vectors for Visualization of Power System Phenomena," *IEEE Transactions on Power Systems* vol. 11, No. 1 (Feb. 1996), pp. 267-273.

Healey, Christopher G., "Perceptual Techniques for Scientific Visualization," *ACM SIGGRAPH* (1999) Course 6, pp. 1-26.

Healey, Christopher G., "Visualizing Real-Time Multivariate Data Using Preattentive Processing," *ACM Transactions on Modeling and Computer Simulation*, vol. 5, No. 3, pp. 190-221.

Hunn, Ketil, "Preattentive Visual Information Processing," http://home.eunet.no/khunn/papers/2030.html. Research Proposal (2000).

McLeod, P., et al, "Visual Search for a Conjunction of Movement and Form is Parallel," *Nature*, vol. 332 Mar. 10, 1988, pp. 154-155.

Nakayama, K. et al., "Serial and Parallel Processing of Visual Feature Conjunctions," *Nature* 320 20, (Mar. 1986), pp. 264-265.

Quinlan, P. et al, "Visual Search for Targets Defined by Combinations of Color, Shape and Size: An Examination of the Task Constraints on Feature and Conjunction Searches," *Perception & Psychophysics*, 1987 41 (5), pp. 455-472.

Treisman, A., "Preattentive Processing in Vision," *Computer Vision, Graphics and Image Processing 31*, pp. 156-177 (1985).

Treisman, A., "Search, Similarity, and Integration of Features Between and Within Dimensions," *Journal of Experimental Psychology: Human Perception and Performance*, 1991, vol. 17, No. 3, pp. 652-676.

Ware, Colin et al., "Perceiving Data Displayed Through Oscillatory Motion", Tech. Rep. TR94-089, Faculty of Computer Science, University of New Brunswick (Nov. 1994).

Wickens, Christopher D. et al., "The Proximity Compatibility Principle: Its Psychological Foundation and Relevance to Display Design," *Human Factors*, 1995, 37(3); pp. 473-494.

\* cited by examiner

MOTION-BASED VISUALIZATION

STATEMENT REGARDING FEDERALLY SPONSORED RESEARCH OR DEVELOPMENT

This invention was made with Government support under Contract No. NMA401-02-C-0019, awarded by the National Imaging and Mapping Agency. The Government has certain rights in this invention.

BACKGROUND OF THE INVENTION

1. Field of the Invention

The present invention is directed to data display. It particularly concerns effectively displaying high-dimensional and complex relational data.

2. Background Information

It is now commonplace to employ computers to sift desired information from databases far too large for individual-human comprehension. Software has been developed for performing analysis of a highly sophisticated nature, and such software is often able to detect trends and patterns in the data that would, as practical matter, be impossible for an individual human being to find.

The converse is often also true. Particularly when the question to be asked does not lend itself to easy definition, computers often have difficulty detecting patterns that are readily apparent to human beings. And this human capability is best brought to bear when the data in question are presented graphically. Data presented graphically usually are more readily understandable than the same data presented only in, say, tabular form. But the degree of the resultant understanding greatly depends on the nature of the display, and determining what the appropriate display should be can present a significant problem.

True, some data almost automatically suggest the type of presentation to which they are best suited. The speed of an airplane as a function of time, for instance, would in most cases simply be presented in a simple x-y plot. And there rarely is any question about the general form of display appropriate to the data that a camera takes. In the former case, the presentation is trivial, since speed and time are the only variables, so they are readily associated with two presentation axes. In the latter, camera case, the data suggest the mode of presentation just as readily, since the domain is a two-dimensional scene and the range is spanned by the colors conventionally employed in printing or presentation on a display screen.

But the way to represent many other types of data is significantly harder to determine. An example is hyperspectral data. Typically, such data are similar to those that result from a camera in the sense that the domain is usually a two-dimensional scene. But the value taken for each picture element ("pixel") in the scene is not a vector representing visible-color components, such as red, green, and blue or cyan, magenta, and yellow. Instead, it is a vector consisting of a relatively large number of components, each of which typically represents some aspect of the radiation received from a respective wave-length band. And the bands often fall outside the visual range. Because of the data's high dimensionality and the limited dimensionality of human visual perception, some degree of selectivity in data presentation is unavoidable, and the decisions that are involved in making the selections have a significant impact on the presentation's usefulness to the human viewer.

High dimensionality also occurs in other kinds of data. In large medical, forensic, and intelligence databases, for example, data objects may represent respective individual people, and the dimensions may be age, gender, height, weight, income, etc.

And presentation problems can arise even in data sets that are not necessarily high-dimensional. Consider link analysis, for example. This type of analysis is used to study subjects as disparate as communications networks and criminal enterprises. Its purpose is to find helpful patterns in the connections between studied entities. To help the user detect such patterns, nodes on a display represent various entities, and lines connecting the nodes represent various relationships between them. In the case of communications networks, for example, the nodes may be, say, Internet Protocol ("IP") routers, and the lines would represent the interconnecting communication links. In the case of a criminal enterprise, the nodes may represent people, organizations, buildings, or other entities under surveillance, while the lines may represent known communications between the entities or represent other relationships, such as ownership, legal control, etc. If the amount of data being presented is large, the resulting diagram can be hard to comprehend even if the underlying data dimensionality is low.

To help human users employ such diagrams effectively, presentation systems have provided features that make important patterns "stand out" from the other data represented. For example, some link-analysis systems employ color, thickness, etc. to highlight the nodes and/or relationships that meet criteria of particular interest. A similar approach is commonly used in "brushing," which is sometimes used when representations of the same data objects are displayed simultaneously in different relative locations in different displays. (The displays can be on the screens of different monitors, for example, or on different parts of a single monitor's screen.) In brushing, a user employs a mouse or other device to select a subset of the objects represented by icons in one display, and the display system highlights other display's objects that represent the same objects.

SUMMARY OF THE INVENTION

We have devised ways of enhancing the effectiveness with which such systems display data to human users. In accordance with one aspect of the invention, for example, we adapt to link analysis a technique described in Bartram & Ware, "Filtering and Brushing with Motion," *Information Visualization*, vol. 1, No. 1, pp. 66–79. Whereas it is commonplace to use motion for animation and other display of time-dependent data, that paper proposes extending it to data that are not necessarily time-based, i.e., to use it to represent non-time-based dimensions of the data.

We have recognized that this technique can be adapted to link-analysis systems. Specifically, by imparting distinctive motion to chosen nodes in a node-link or similar display, we distinguish them from other nodes. Thus using motion instead of, say, color to highlight those nodes tends to make their membership in the criterion-satisfying subset apparent to the human user without obscuring other information that the display contains. We also apply this approach to brushing.

In accordance with another aspect of the invention, we provide the motion in a way that turns out to be particularly effective in displays whose data-object density is high. Specifically, we generate for each of a plurality of the data objects a model of a moving three-dimensional body located in a three-dimensional model space, and we project the resultant ensemble of bodies into a display surface to obtain the values with which to generate the display. This tends to make patterns stand out even in information of relatively high dimensionality.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
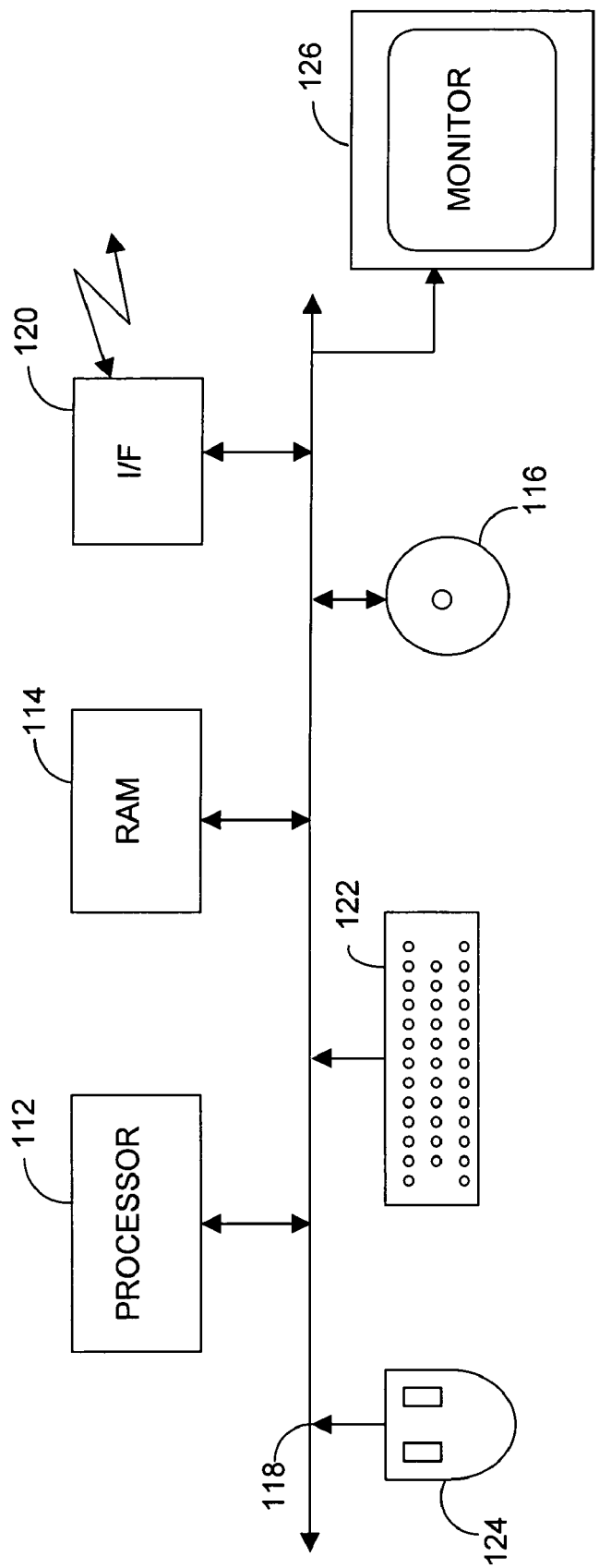
FIG. 1 is a block diagram of a computer system in which the present invention's teachings may be implemented.

The present invention can be implemented on a wide range of hardware and/or software, of which FIG. 1 an example. A processor 112 operates in accordance with instructions loaded into a memory 114. The instructions will ordinarily have been loaded into the memory from local persistent storage in the form of, say, a disc drive 116 with which the memory communicates by way of a local bus 118. The instructions may additionally or instead be received by way of a communications interface 120 from a remote instruction source, which would usually be some sort of persistent storage, too. The system may also receive user input from devices such as a keyboard 122 or mouse 124. Electromagnetic signals representing the instructions may take any form. They are typically conductor-guided electrical signals, but they may also be visible- or invisible-light optical signals or microwave or other radio-frequency signals.

The instructions indicate to the processor how it is to operate on data typically received in ways similar to those in which the instructions are. In accordance with some of those data operations, the instructions cause the processor to present some of the data to one or more human users by driving some type of display, such as a local monitor 126.

The present invention's teachings can be applied to representing a wide variety of data objects. One of the invention's aspects is particularly applicable to data that specify various types of relationships between data objects that the data also represent. For example, the data may represent the results of criminal investigations: certain of the data objects may represent surveillance targets such as people, buildings, or businesses. Of particular interest in the context of link analysis, some of the objects may include references to other objects.

Figure 2:
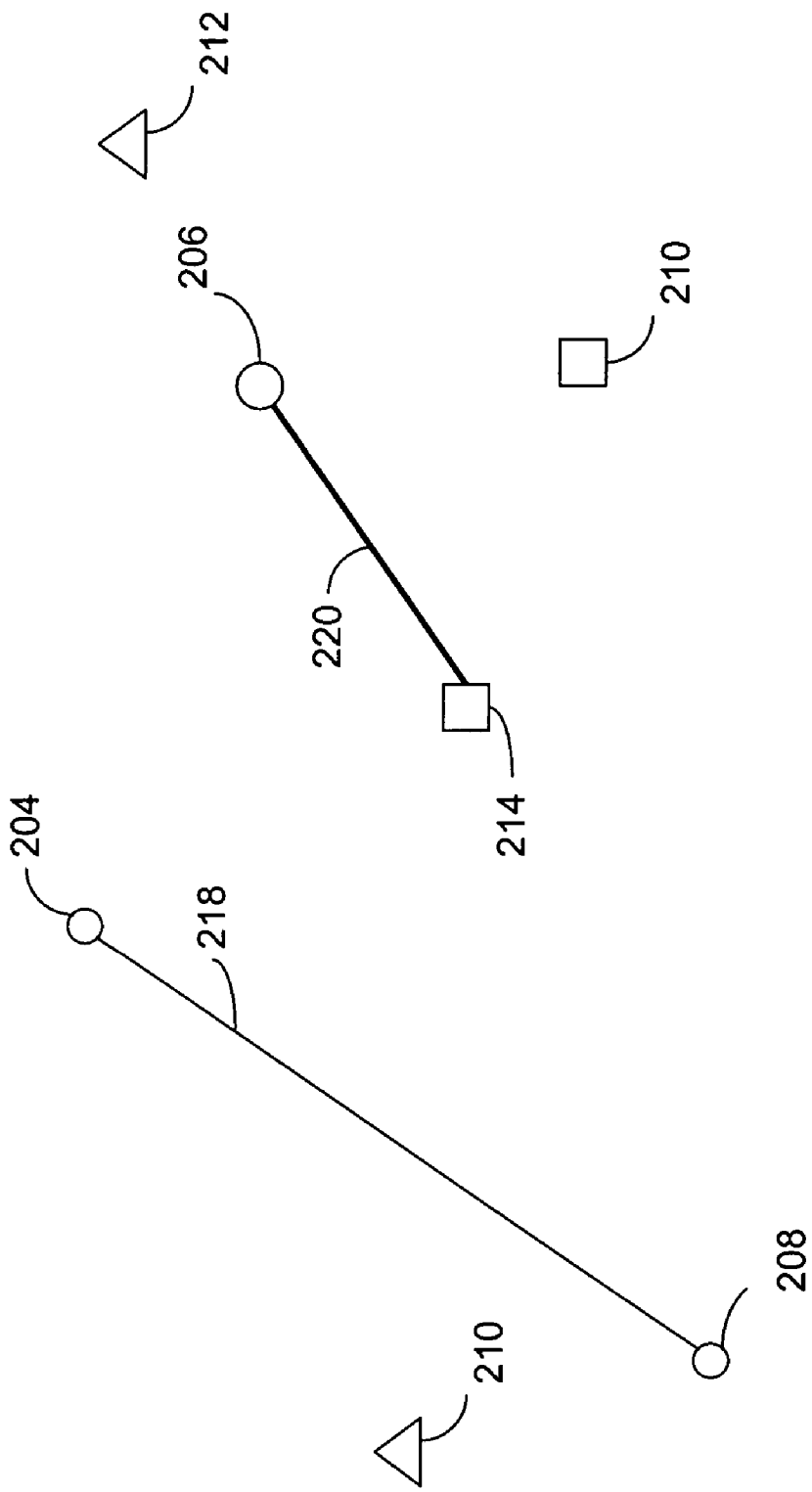
FIG. 2 is diagram of a display of the type often employed for link analysis.

FIG. 2 illustrates in a simplified manner how the system may present the objects in a display for link analysis. Each of the nodes 204, 206, 208, 210, 212, and 214 represents a different data object. For purposes of illustration, the drawing employs more than one style of icon to represent the nodes. This is not a necessary feature of the invention, but thus varying the icon type is one way to impart additional information. If the objects represent surveillance targets, for example, one of each object's fields may indicate what type of target it is, e.g., whether the target is a person, a building, a business, etc. If so, the types of icons placed at those nodes can represent that aspect of the object's contents. In the illustrated example, the icons at nodes 204, 206, and 208, represent people, those at nodes 210 and 212 represent corporations, and those at nodes 214 and 216 represent buildings.

So a display feature such as icon shape can be used to represent one of the data's dimensions. Another dimension, such as the priority assigned to the target's surveillance, may be represented by the icon's color. Also, although the nodes' locations on the display are essentially arbitrary in some link-analysis applications, they represent some aspect of the data, such as the target's geographical location, in others.

In some fashion, the data also specify relationships among the objects. For example, each object may include fields whose contents represent relationships to other data objects or represent pointers to arrays of such fields. Such a field may include, say, a pointer or handle to the object linked by the represented relationship and may also include information about the relationship's type. The display's lines represent those relationships, and, in this example, the line style conveys information, too. For example, line 218, which is relatively thin, represents the fact that the target represented by node 206 has communicated by telephone with the target that node 208 represents. And line 220, which is thicker, indicates that target 206 owns target 214. Other types of relationships may be represented by dashed lines, arc-shaped lines, etc.

Figure 3:
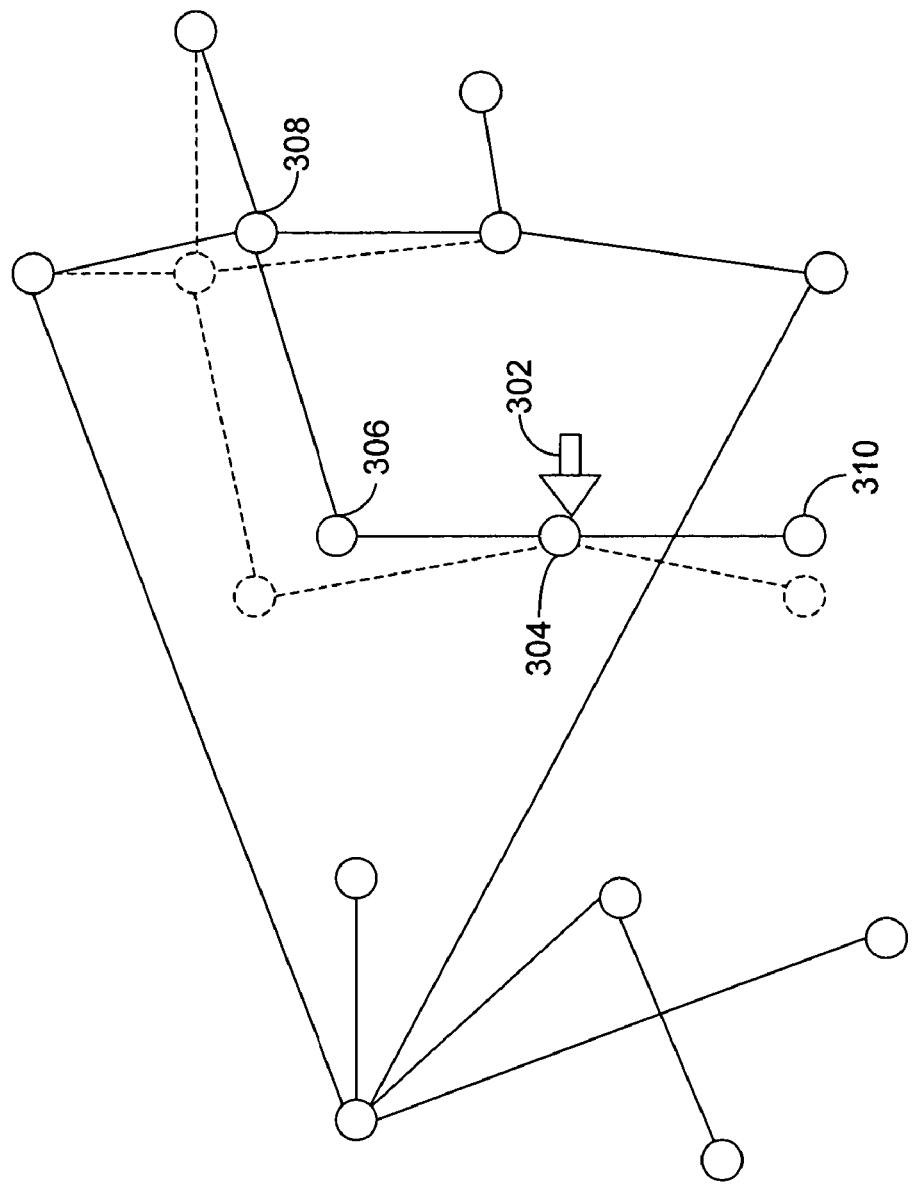
FIG. 3 is a diagram that illustrates the result of using such a display in accordance with one of the invention's aspects.

For the sake of simplicity, FIG. 2 shows only a few nodes and lines. In most situations to which graphical link analysis is applied, though, the number of nodes and lines is much greater, so the display is often difficult to comprehend. One of the present invention's aspects serves to aid comprehension. According to this aspect, the system selectively moves icons for this purpose. Suppose, for example, that the user wants to see all targets that satisfy some criterion. For the sake of simplicity, let us assume the criterion that the target has to be within two communications links from a base target. The user may have chosen the base target by, say, "clicking" on it. To identify the targets that meet this criterion, the display system causes their icons to move. FIG. 3 illustrates this. Cursor 302 represents the user's choosing node 304, and the dashed lines represent the resultant motion of nodes 306, 308, and 310, which satisfy that criterion. In most displays, the lines connected to the nodes will "rubber band," i.e., will so stretch with the node movement as to remain connected despite that motion.

That example uses a direct form of user input: the user employs a mouse to select one of the targets. But link analysis does not always require that type of input. For example, the criterion may be that motion is imparted to nodes representing all targets owned by high-priority targets; i.e., the selection is totally data driven.

This approach to representing the data is advantageous because, although the user could, by careful attention, identify the targets that are within two communications links of the chosen target, making them move causes them to "jump out" at the viewer, and it can do so without, say, changing any colors and thereby obscuring originally presented information.

A similar approach can be applied to what is often termed "brushing," which is a technique often employed when multidimensional data are presented in more than one display simultaneously. For example, the axes in one display may represent one pair of the data components, while those in a different display may represent a different pair. As another example, consider a situation in which at least one of the displays is an income histogram in which each of the bars is considered to be a stack of icons representing respective people whose incomes belong to the corresponding income range, while another display is an age histogram of the same people. In yet another example, one or more of the diagrams is a cluster diagram: icons representing different objects are clustered together in accordance with some similarity metric computed as some function of the objects' data components.

In brushing, a user in some fashion selects a subset of the object-representing icons in one of the displays, and the display system indicates which of the icons in the other display correspond to the same data objects. The user may, for example, select objects by causing a cursor to touch the corresponding icons or draw an enclosure about them; in the histogram case the user may simply click on one of the bars. Or he may select the objects in some other manner, such as by entering a selection criterion. To identify the corresponding icons in the other display, some conventional display systems highlight the other display's icons that correspond to the same objects. But conventional highlighting can obscure the information provided by, for instance, color. Using motion instead avoids this effect.

Figure 4:
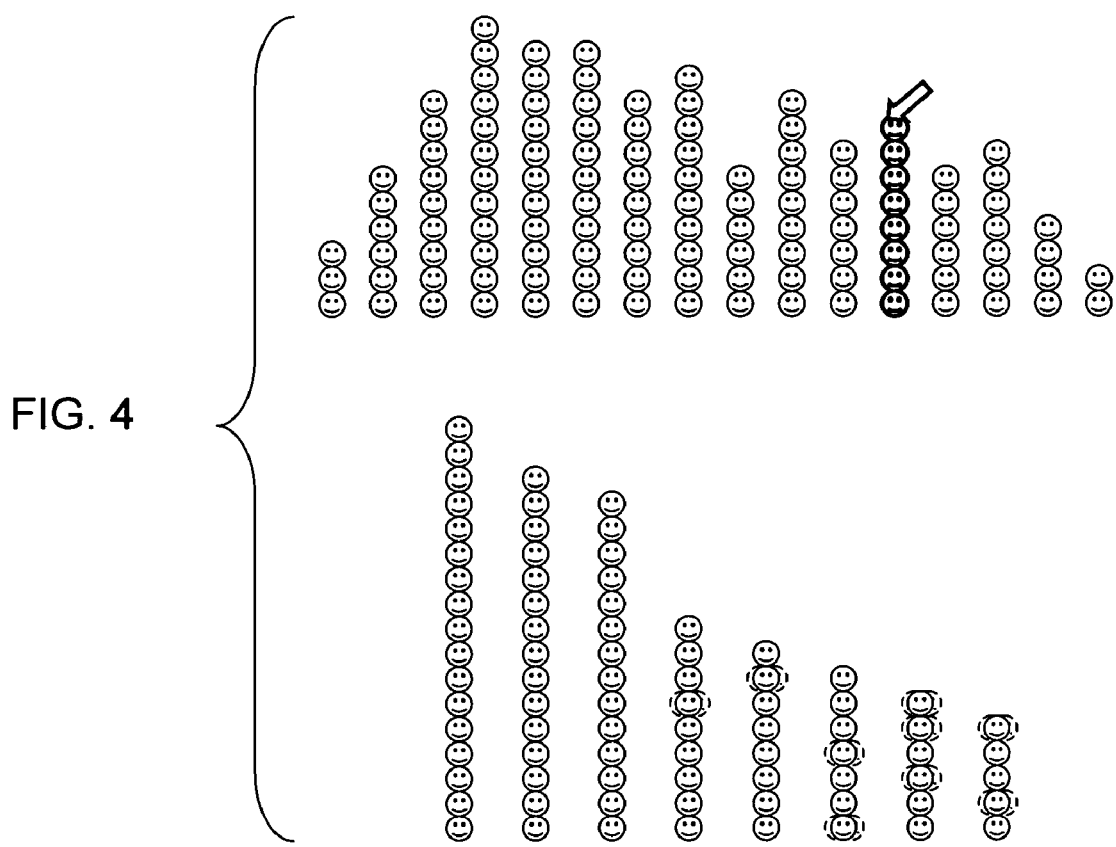
FIG. 4 depicts exemplary histograms in which brushing is being performed.

FIG. 4 illustrates this type of brushing for a situation in which both displays are histograms of the type described above. In that drawing's upper plot, the user has selected one of the income bins, and, by moving the corresponding icons in the lower plot, the display system illustrates the user-selected income group's distribution among the various age groups.

Another type of display that benefits from the use of motion to distinguish different sets of data is the type that employs "layers" of data. A simple example is simultaneous presentation of different sets of transistor characteristic curves. A bipolar transistor's characteristics are often given as a set of curves on a common graph, each curve depicting collector current as a function of collector-to-emitter voltage for a different value of base current. To compare transistors, it would be helpful to be able to compare their characteristic curves visually. One way to do this is to plot different transistors' curve sets on the same axes.

Although different transistors' data can be distinguished from each other by assigning different colors to different transistors' curves, the results rapidly become hard to read as the number of transistors grows; even three transistors' data can present a challenge to comprehension. Moreover, using color to distinguish one transistor's data from another's prevents another use of color, namely, to indicate which curves for the different transistors correspond to the same base current. True, the display system can employ different line styles (solid, dashed, etc.) to help the viewer distinguish the data, but the display still rapidly becomes confusing as data are added for more transistors.

A significant increase in user comprehension results from using motion to distinguish different transistors' data. For example, the user may select two transistors for particular attention from a group of, say, ten whose data a display presents. In response, the display may make one selected transistor's curves vibrate vertically and the other's vibrate horizontally. The user could then readily recognize which data belong to the chosen transistors, and the comparison could be aided by having a given curve color represent the same base-current value for all transistors.

This type of display may be referred to as a "layered" display because different transistors' curves can be thought of as being disposed on transparent sheets, or "layers" that lie on top of one another. The layered-display technique is used more frequently for naturally graphical data, of which a simple example may be arise in a display system that presents a map of all the roads in a region. Although all the roads are displayed in the one map, the layout of the county-maintained roads may be stored separately from that of the state-maintained roads, which are stored separately from federally maintained roads, logging roads, railroads, etc. Again, therefore, the data may be thought of as being presented in layers. In response to the user's selection of, say, country roads and logging roads, the display system could make the county-road layer vibrate in the vertical screen direction, for example, while the state-road layer could vibrate, say, circularly.

The motion approach's benefits for layered-type displays are particularly apparent when the different data sets include graphical gray-scale or color data rather than simple line drawings such as those of the two previous examples. Display systems sometimes simultaneously present maps of the same region at different eras, for example, achieving the layering by giving the different layers degrees of "transparency." In such maps, which include area features rather than lines only, it is particularly difficult to use color or line style to distinguish effectively among the layers. But motion can often cause chosen layers to stand out when other techniques for distinguishing them are ineffective.

This use of different types of motion can be used in link displays and brushing, too. In those types of displays, the icons meeting a given criterion need not all move in the same way or in synchronism with each other. But consider an embodiment that operates as follows. The user first clicks on one target to cause the system to emphasize the relationships with that target, and the system responds by causing the criterion-satisfying nodes to vibrate vertically. If the user then clicks on another target while, say, holding down the shift key, he thereby indicates that the system should point out the targets linked to newly chosen target while continuing the previous vibrations, and the system causes the targets linked to the newly selected target to vibrate horizontally instead of vertically.

In that simple example, the distinction is between two directions of linear motion. Both other types of motion can be used instead or in addition. Both these types of linear motion could be distinguished from diagonal linear motion, for example. Distinctions could also be made on the basis of phase or frequency: two sets of nodes vibrating linearly in the same direction could be caused to vibrate out of phase with each other, or at different frequencies. Also, the motion need not be linear; it may be elliptical, for instance, in which case another distinction can be made on the basis of whether the motion is clockwise or counterclockwise. And the motion is not necessarily a change in position from some rest position; it can, for instance, be a change in shape, such as rhythmic expansion and contraction of the icon that represents the data object.

Figure 5A:
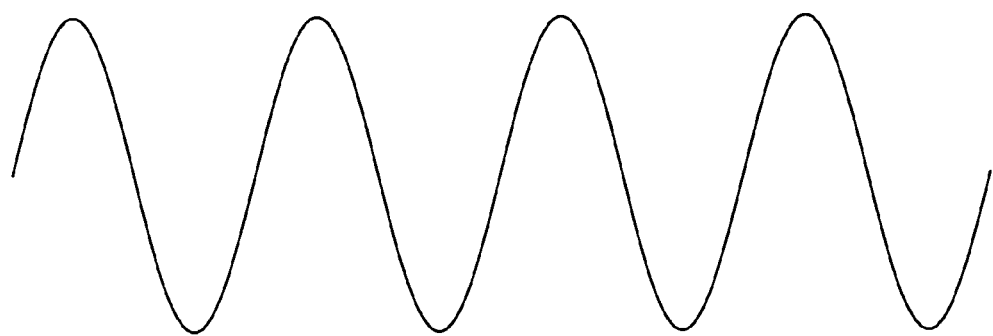
FIGS. 5A, 5B, and 5C are plots of one component of the motion of a body that represents a data object in accordance with the present invention.
Figure 5B:
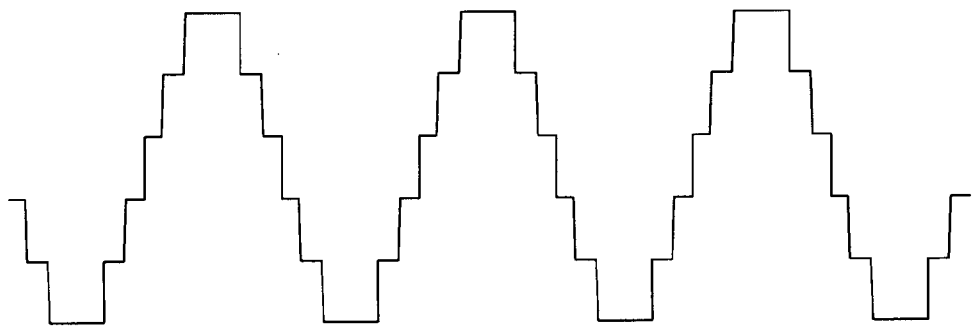
Figure 5C:

Nor does the motion have to be harmonic vibration. Among the many motion patterns that may be employed are those of which FIGS. 5A, 5B, and 5C depict one component. (In the case of elliptical motion, for example, the plot of FIG. 5A would be the component parallel to, say, ellipse's major axis, with which the motion component parallel to the minor axis would be 90° out of phase.) The harmonic motion that FIG. 5A depicts is typical. But some embodiments may instead or additionally employ other types of motion, such as the stuttering motion of FIG. 5B. Another example is the repeatedly decaying harmonic motion that FIG. 5C illustrates. Moreover, distinctions can be made and additional information imparted not only by the selection of the general type of motion pattern but also by the particular parameters of that motion. When the repeatedly decaying motion of FIG. 5C is employed, for example, some of the bases for distinguishing among data sets or conveying information about individual data objects can be the rate of decay, the repetition rate, etc.

In any event, thus using motion for graphical link analysis, layer-type displays, and similar data-presentation techniques can significantly enhance the user's comprehension.

Figure 6:
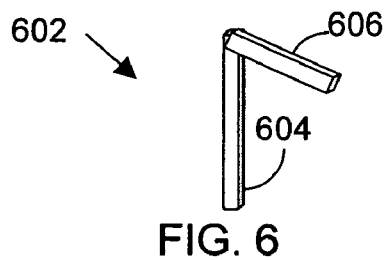
FIG. 6 is a diagram that illustrates one kind of three-dimensional body in whose features an object's data can be encoded in accordance with one of the invention's aspects.

Another aspect of the invention is directed to the way in which the motion is generated. According to this aspect of the invention, the motion results from depicting moving three-dimensional bodies on the display. Each body represents a respective data object, and various features of the body's motion represent respective components of data object's multi-dimensional data. The particular type of body is not critical, but FIG. 6 depicts for the sake of example a simple body type that we have employed. In that drawing, body 602 includes nothing more than an upright 604 and an arm 606 attached to the upright.

The benefits that this type of motion generation affords extend beyond data-presentation techniques of the type described so far. For example, consider a system in which the data objects are pixel data for a "hyperspectral" image. In natural-vision images, each pixel is usually represented by a color vector consisting of components for, say, red, green, and blue, cyan, magenta, and yellow, or some similar set of values by which a natural color can be approximated. The data are often the output of a camera whose sensors measure radiation intensities within different visible-light bands. Hyperspectral images are similar in the sense that each pixel is represented by a vector whose components represent radiation within different wavelength bands. The difference is that the number of wavelength bands is usually much more than three, and most bands do not fall within the visible range. Also, although the values usually represent intensities; they may additionally or instead represent other quantities, such as Stokes parameters.

Some of such data's dimensionality can be encoded in the colors of a false-color image, but it will enhance a user's ability to detect patterns if some components are encoded in aspects of a three-dimensional body's motion. As will become apparent, this technique's applicability is not limited to hyperspectral imaging; it can be used on a wide range of data types, independently of their dimensionality. But its advantages will be most apparent in scene-type data, such as hyperspectral-sensor data, magnetic-resonance-imaging data and other data whose objects tend to be organized in arrays.

Figure 7:
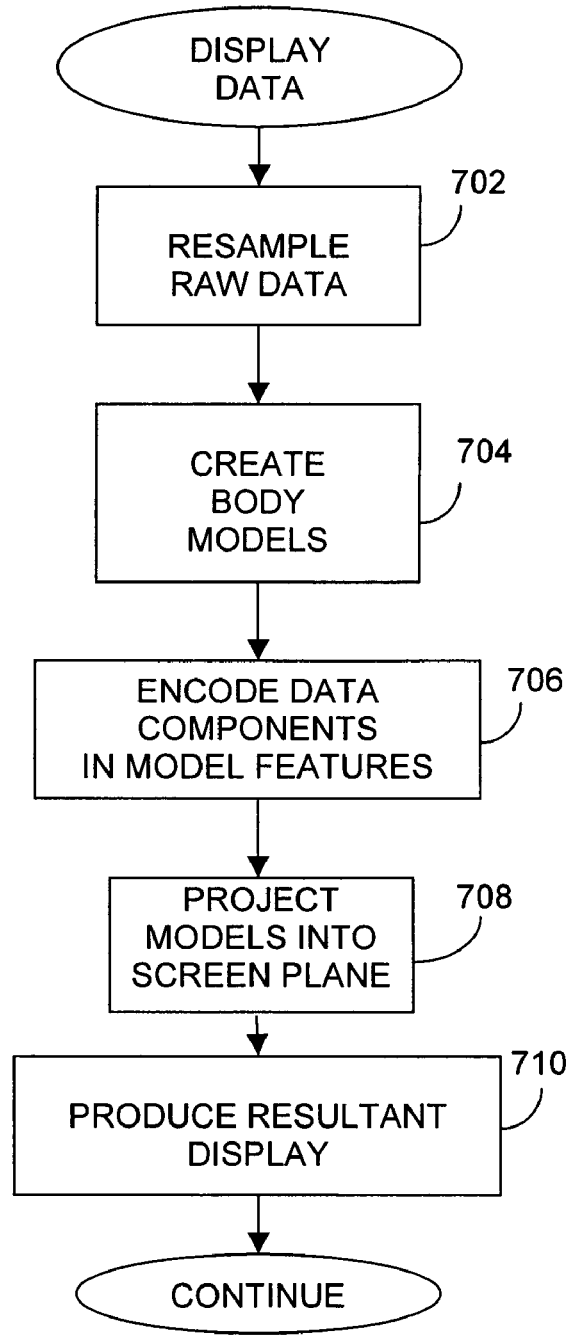
FIG. 7 is a flow chart of the manner in which one embodiment of the invention operates.

FIG. 7 is a conceptual block diagram of the overall approach. The raw data will typically be in the form of a two-dimensional array of high-dimensional pixel values. That is, the object's position in the array implicitly encodes the two-dimensional location of the pixel that the (high-dimensional) object represents, although there is no reason in principle why three-dimensional-location information could not be stored, in a three-dimensional array. In some cases, the raw data's location granularity is coarser or finer than is convenient for employing simulated three-dimensional bodies to represent the objects, so the data may be re-sampled, as block 702 indicates, typically by employing one of the standard multi-rate sampling techniques.

A body model is then constructed for each object, as block 704 indicates. As an example of how this may be done, consider FIG. 8. That drawing depicts two bodies 802 and 804 in a (three-dimensional) model space. The original image plane is mapped to a map plane 806 or other two-dimensional map surface in model space, and the bodies 802 and 804 are assigned zero-displacement positions at the locations in the model space to which the pixels that they represent are mapped. For example, a body's zero-displacement position may be considered to be the one at which its upright is oriented perpendicular to the map plane and intersects the map plane at the upright's midpoint.

Each of a plurality of a given data object's components are then mapped to various aspects of the moving body's features, including size, rate and/or mode of motion, and position. For example, the value of one of the data components—e.g., intensity, another Stokes parameter, or some other radiation-indicating quantity in the hyperspectral example—may be encoded in-the arm's elevation angle 810. Another component—say, another of the Stokes parameters for the same band—may be encoded in the arm's rate and direction of azimuthal rotation 812. Also, pitch, roll, and yaw axes may be defined with respect to the normal to the map plane, and various components may be encoded in the upright's roll, pitch, and yaw angles and in those angles' rate of change. And components can be encoded in the body's size. For example, some embodiments may encode certain components in the arms' and uprights' lengths or thicknesses or in ratios of those lengths or thicknesses or in the rates at which any of those change.

If the upright, too, is made to move, other components can be encoded in various aspects of that motion. If the motion is simple up-and-down motion, for example, data components can be encoded in the upright's mean position (with respect to its zero-displacement position) and in the amplitude, phase, and frequency of its vertical motion. If the upright's motion is more complex, further components can be encoded in that motion's other aspects. Note also that some of these features do not require that the body move.

Also, there may be an element of indirectness in the motion coding. Suppose, for example, that the system attributes physical characteristics such as mass, elasticity, etc. to the bodies and that one or more components are encoded into such features. Suppose further that the bodies are simulated as being disposed in a gravitational field and/or as being attached to a common platform that undergoes some type of motion, such as rhythmic or irregular translation or pivoting. By encoding the data components directly into those features, the system encodes the data indirectly in the motion: the types of motion that the bodies undergo depend on the underlying data, so, again, the display may reveal patterns in the data. Similar effects may be exhibited if the system simulates wind flowing past the bodies. For such a system, it may be desirable for the bodies to take the forms of flexible reeds in whose features the object components are so encoded as to affect the reed's flexibility. Other forms of indirect encoding will also suggest themselves to those skilled in the art.

Our experiments so far have concentrated on a simple body of the type that FIG. 6 illustrates, and we have concentrated on five shape parameters and twelve motion parameters. The shape parameters on which we have concentrated are the upright's height, the arm's length, the angle that the arm forms with the upright, the upright's angle with respect to the map plane, and the arm's azimuth, i.e., its position around the upright. The motion parameters came in four categories: azimuthal rotation of the upright, changes in the entire body's vertical position, circular changes in its horizontal position, and changes in the upright's tilt angle. The time variation of the motion in each case was a simple sinusoid, so there were three parameters, namely, amplitude, frequency, and phase, within each of the four categories. A further parameter within at least the first three categories is the mean, or "rest" position about which the motion occurs. A data component can be encoded in the difference between this and the zero-displacement position to which the corresponding pixel has been mapped. These parameters can be considered akin to shape parameters, since they do not themselves require motion.

FIG. 7's block 706 represents all such encoding. It is apparent that, at least theoretically, an extremely high number of different data components can thus be encoded in a body's features. As a practical matter, of course, there comes a point at which the resultant visual information becomes overwhelming to the human viewer. But we believe that a human viewer can effectively comprehend patterns resulting from up to fifteen and possibly more different components encoded in this fashion.

Figure 8:
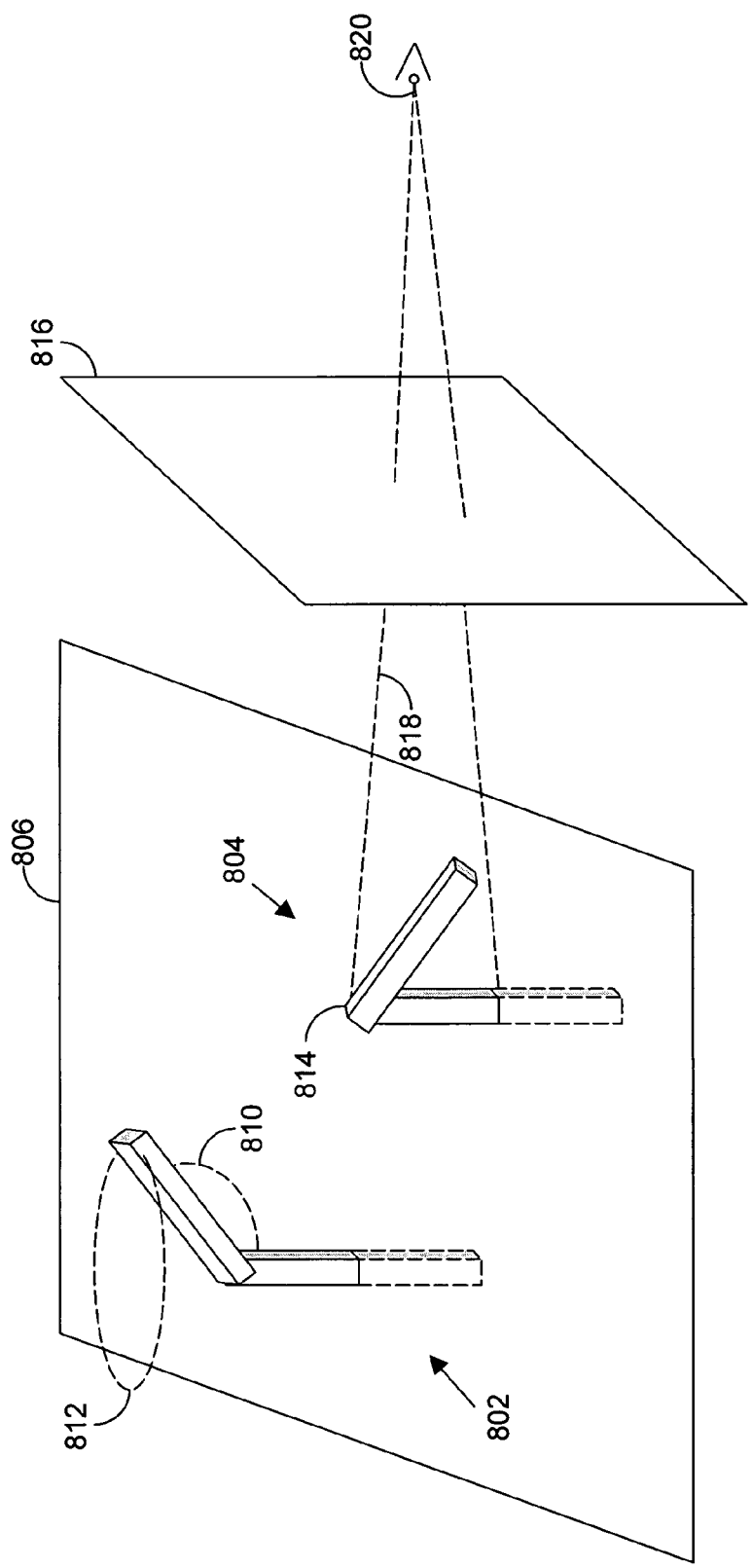
FIG. 8 is a diagram that illustrates one way in which a display can be generated from three-dimensional models that represent data objects in accordance with one of the present invention's aspects.

With the information thus encoded, the system generates the display by mathematically projecting the three-dimensional models onto a screen plane, as FIG. 7's block 708 indicates. The map and screen planes may be parallel, but the invention's advantages are most apparent when there is some angle between those planes. FIG. 8 depicts a perspective projection, i.e., one in which points such as point 814 in the model space are projected onto the screen plane 816 along a line such as line 818 from the model-space point to a common viewpoint 820 located a finite distance away. More typically, the projection would be orthogonal: the viewpoint would be disposed at an infinite distance. In any event, the display would then be so driven as to produce the resultant image, as FIG. 7's block 710 indicates.

Figure 9:
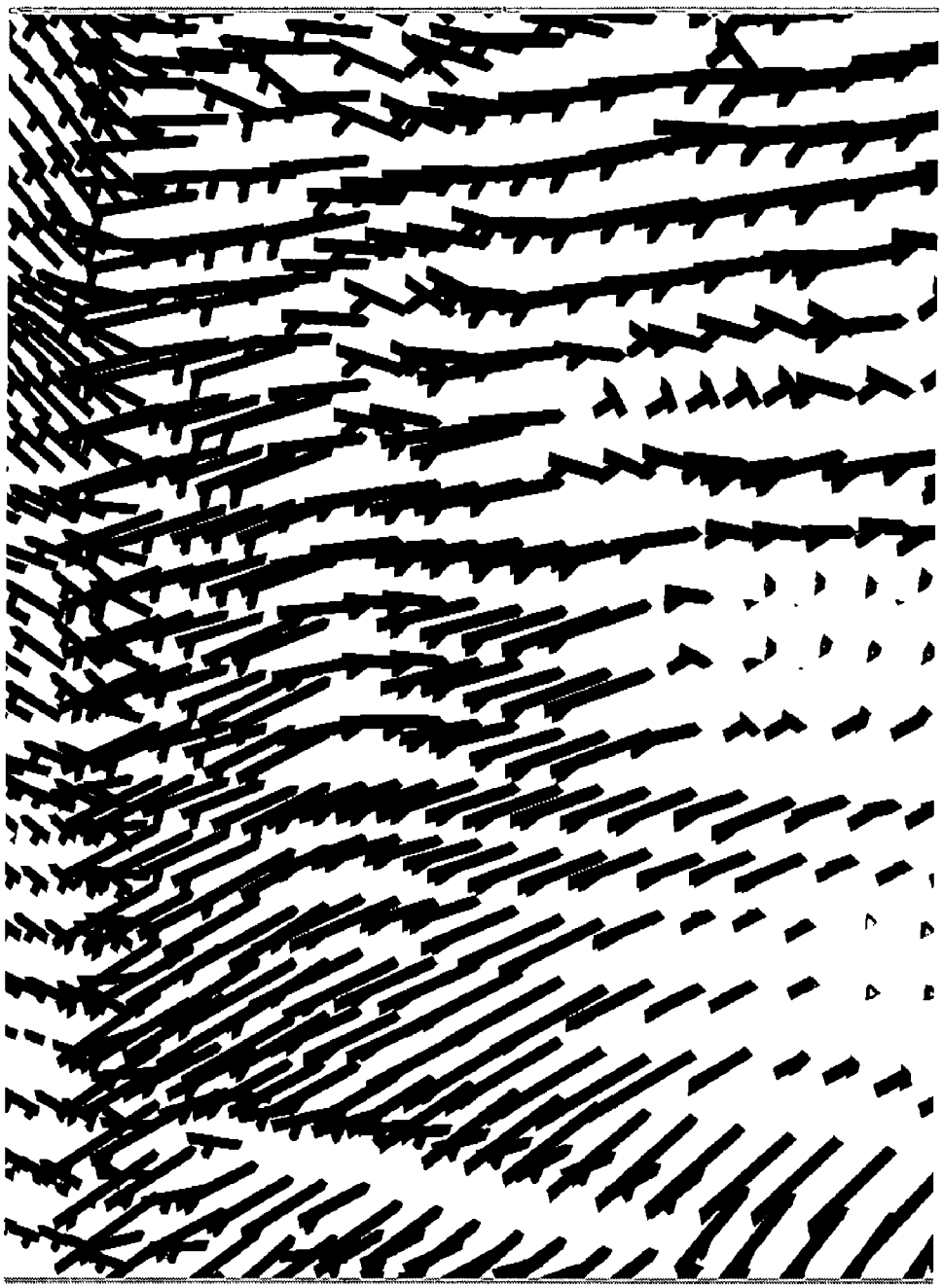
FIG. 9 depicts a small segment of a display generated by projecting such models.
Figure 10:
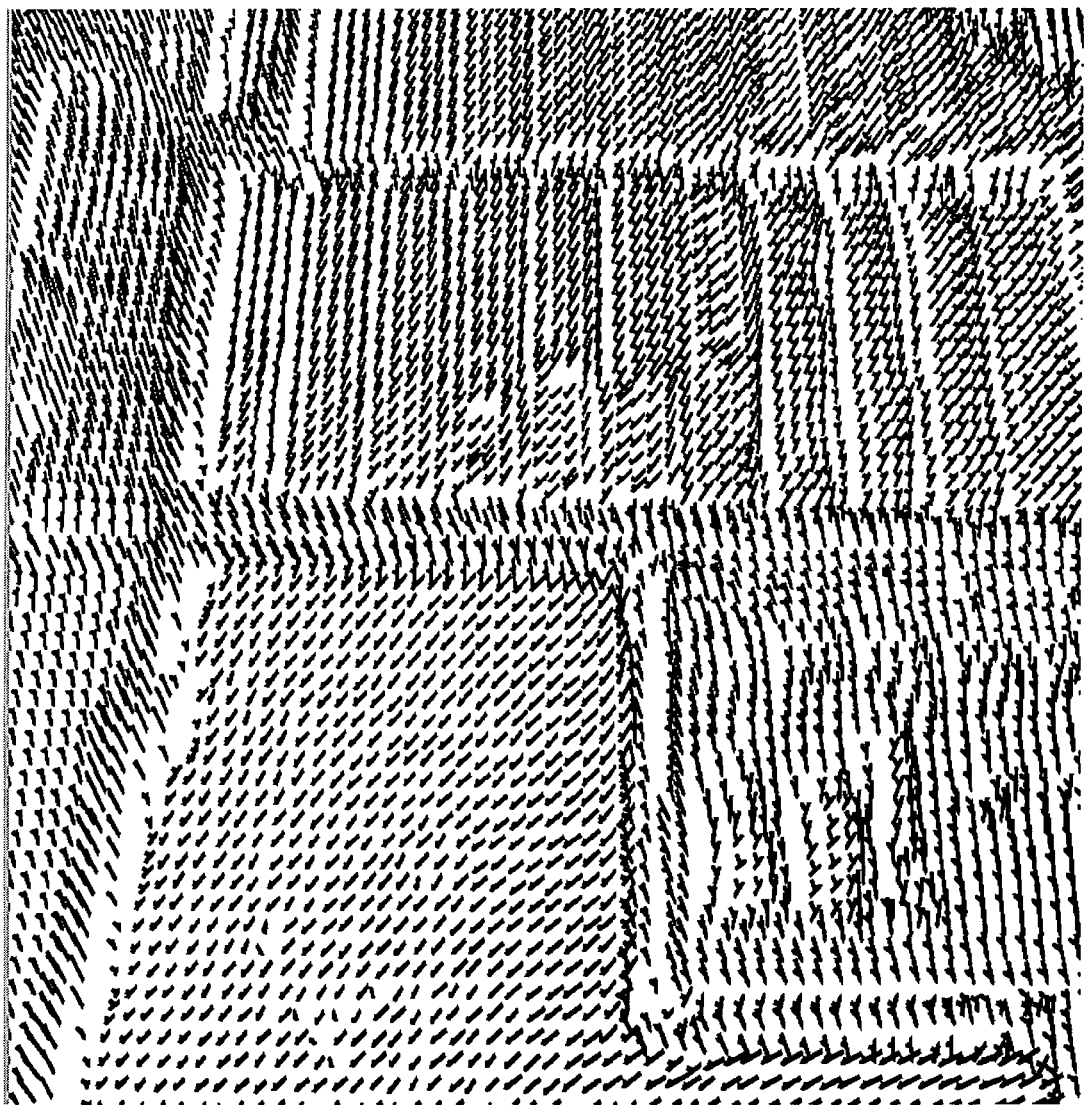
FIG. 10 depicts a larger segment of such a display.

FIG. 9 depicts a small portion of a display that can result when the map plane forms a relatively small angle with the screen plane. The projections of some of the bodies are so small as to be nearly imperceptible, while other bodies' projections are quite long. Although data components are thus encoded, the user typically would not, in that example, directly infer the values of an individual data object's components from the display. He would instead observe overall patterns, possibly of the type that FIG. 10 illustrates, from which he may be able to infer information about the scene or identify avenues for further inquiry.

By employing the present invention's teachings, a display system can enable a user to detect patterns readily in a presentation of highly complex data. The invention thus constitutes a significant advance in the art.

Although the present invention has been particularly shown and described above with reference to illustrative embodiments, alterations and modifications thereof may become apparent to those skilled in the art. It is therefore intended that the following claims cover all such alterations and modifications as fall within the true spirit and scope of the present invention.

What is claimed is:

1. A method for performing link analysis comprising:
   A) providing data that include data objects and representations of relationships between the data objects;
   B) placing on a display a plurality of nodes associated with the data objects;
   C) applying a selection criterion to the data objects, said selection criterion indicative of a relationship between the data objects; and
   D) causing a repetitive predetermined form of motion to be executed by all of the nodes that satisfy the selection criterion, but not by any of the nodes that do not satisfy the selection criterion.

2. A method as defined in claim 1, further including connecting the nodes that satisfy the selection criteria by lines, wherein the lines between the nodes remain connected to those nodes despite that repetitive motion.

3. A method as defined in claim 1 comprising:
   A) designating one or more of the nodes as target nodes; and
   B) applying the selection criterion so that a path connecting the node that satisfies the selection criterion is connected with at least one said target node by less than a predetermined number of lines.

4. A method as defined in claim 3 wherein each line that extends between nodes of which at least one is in motion so moves as to remain connected to those nodes despite that motion.

5. A link-analysis-display system comprising:
   A) a storage device containing data that include data objects and representations of relationships between the data objects;
   B) a display device operable by application of display signals thereto to produce a visual display; and
   C) display-signal-generating circuitry that applies a selection criterion to each of a plurality of the data objects and generates and applies to the display device display signals that so control the display device as to:
      i) place on the display a node for each of a plurality of those data objects; and
      ii) cause a repetitive predetermined form of motion to be executed by each of the nodes that represents a data object that satisfies the selection criterion but not by any of the nodes that represents a data object that does not satisfy the selection criterion.

6. A link-analysis-display system as defined in claim 5 wherein the display signals controls the display device so as to place lines on the display that represent respective ones of the relationships, and wherein each line that extends between nodes of which at least one is in motion so moves as to remain connected to those nodes despite that motion.

7. A link-analysis-display system as defined in claim 5 wherein:
   A) the system includes an input device by which a user can designate one or more of the nodes as target nodes; and
   B) the selection criterion as applied to a given data object is that a path comprising less than a predetermined number of lines connects the node representing the given data object with at least one said target node.

8. A link-analysis-display system as defined in claim 7 wherein each line that extends between nodes of which at least one is in motion so moves as to remain connected to those nodes despite that motion.

9. A storage medium containing computer instructions readable, by a computer system that includes a display device operable by application of display signals thereto to produce a visual display and further includes display-signal-generating circuitry that generates and applies display signals to the display device, to configure the computer as a link-analysis-display system that:
   A) applies a selection criterion to each of a plurality of data objects in a data set that includes data objects and representations of relationships between the data objects; and
   B) causes a repetitive predetermined form of motion to be executed by each of the nodes that represents a data object that satisfies the selection criterion but not by any of the nodes that represents a data object that does not satisfy the selection criterion.

10. A storage medium as defined in claim 9 wherein the link-analysis-display system places lines on the display that represent respective ones of the relationships, and wherein each line that extends between nodes of which at least one is in motion so moves as to remain connected to those nodes despite that motion.

11. A storage medium as defined in claim 9 wherein:
   A) the system includes an input device by which a user can designate one or more of the nodes as target nodes; and
   B) the selection criterion as applied to a given data object is that a path comprising less than a predetermined number of lines connects the node representing the given data object with at least one said target node.

12. A storage medium as defined in claim 11 wherein each line that extends between nodes of which at least one is in motion so moves as to remain connected to those nodes despite that motion.

13. An electromagnetic signal representing computer instructions readable, by a computer system that includes a display device operable by application of display signals thereto to produce a visual display and further includes display-signal-generating circuitry that generates and applies display signals to the display device, to configure the computer as a link-analysis-display system that:
   A) applies a selection criterion to each of a plurality of data objects in a data set that includes data objects and representations of relationships between the data objects; and
   B) causes a repetitive predetermined form of motion to be executed by each of the nodes that represents a data object that satisfies the selection criterion but not by any of the nodes that represents a data object that does not satisfy the selection criterion.

14. An electromagnetic signal as defined in claim 13 wherein the link-analysis-display system places lines on the display that represent respective ones of the relationships, and wherein each line that extends between nodes of which at least one is in motion so moves as to remain connected to those nodes despite that motion.

15. An electromagnetic signal as defined in claim 13 wherein:
   A) the system includes an input device by which a user can designate one or more of the nodes as target nodes; and
   B) the selection criterion as applied to a given data object is that a path comprising less than a predetermined number of lines connects the node representing the given data object with at least one said target node.

16. An electromagnetic signal as defined in claim 15 wherein each line that extends between nodes of which at least one is in motion so moves as to remain connected to those nodes despite that motion.

* * * * *